United States Patent [19]

Signer

[11] Patent Number: 5,564,827
[45] Date of Patent: Oct. 15, 1996

[54] DEVICE FOR THE HOMOGENIZATION OF HIGH-VISCOSITY FLUIDS

[75] Inventor: Arno Signer, Wiesendangen, Switzerland

[73] Assignee: Sulzer Chemtech AG, Winterthur, Switzerland

[21] Appl. No.: 432,178

[22] PCT Filed: Sep. 30, 1994

[86] PCT No.: PCT/CH94/00195

§ 371 Date: Apr. 27, 1995

§ 102(e) Date: Apr. 27, 1995

[87] PCT Pub. No.: WO95/09689

PCT Pub. Date: Apr. 13, 1995

[30] Foreign Application Priority Data

Oct. 5, 1993 [EP] European Pat. Off. .............. 93810701

[51] Int. Cl.$^6$ ...................................................... B01F 5/06
[52] U.S. Cl. ............................................ 366/336; 366/340
[58] Field of Search ...................................... 366/336, 337, 366/338, 339, 340, 176.1, 176.2, 176.3, 176.4

[56] References Cited

U.S. PATENT DOCUMENTS 2,584,827  2/1952  Bailey .
3,860,217  1/1975  Grout ........................................ 366/336
4,207,202  6/1980  Cole ......................................... 366/337
4,731,229  3/1988  Sperandio ............................... 366/336
4,747,697  5/1988  Kojima .

FOREIGN PATENT DOCUMENTS 606324    6/1926  France .
1319212   1/1963  France .
1807922   6/1969  Germany .
564966    8/1975  Switzerland .
2020987  11/1979  United Kingdom .

Primary Examiner—Robert W. Jenkins
Attorney, Agent, or Firm—Townsend and Townsend and Crew LLP

[57] ABSTRACT

The device for the homogenization of high-viscosity fluids comprises static mixing elements (11, 12) and possibly filter elements (6). These elements of the device are arranged in a sleeve (13) along the sleeve axis (15). According to the invention the sleeve is composed of several parts; the elements of the device are monolithic structural members (10, 20; 60) and all or a plurality of these structural members have flange-like or nose-like parts (4; 4a, 4b). With these parts the structural members engage so as to anchor in the sleeve region between sleeve parts and form, at the same time, parts of the sleeve. The device according to the invention is provided, for instance, as a mixing head (1) in the nozzle of an injection molding machine or as a melt mixer of an extruder.

19 Claims, 3 Drawing Sheets 5,564,827

DEVICE FOR THE HOMOGENIZATION OF HIGH-VISCOSITY FLUIDS

BACKGROUND OF THE INVENTION

The invention relates to a device for the homogenization of high-viscosity fluids and also to uses of such a device.

During the extrusion and injection molding of thermoplastic materials, homogenous—particularly thermally homogenous—melts are produced using static mixers. Without special provisions plastics melts in plastification machines on leaving the screw exhibit considerable temperature differences; when coloring agents and/or additives are added, their distribution can also be irregular. In injection molding machines the necessary homogeneity of the plastics melt is obtained by the provision of a mixing head in the nozzle (see e.g. G. Schneider and R. Maurer, Österr Kunststoff-Zeitschrift, 1985, pages 86–89).

A mixing head or melt mixer comprises a sleeve in which are situated several mixing elements. Due to the high viscosity of plastics melts large forces act on the mixing elements and also between the mixing elements and the sleeve. In a preferred embodiment of the mixing head, the mixing elements are in the form of a casting which is monolithic (i.e. cohesive without joints) and is soldered into the sleeve. Such a mixing head has the disadvantage that under extreme conditions the soldered joint may not survive. Such extreme conditions which may arise during faulty operation are, for instance: cold start (with a peak pressure of around 2000 bar), fast heating, cleaning with a naked flame, or quenching at an annealing temperature with water.

SUMMARY OF THE INVENTION

An aim of the invention is to provide a device for the homogenization of high-viscosity fluids—for instance a mixing head or a melt mixer—which remains, as far as possible, indestructible even under extreme conditions. Such device should be also able to be readily cleaned. The device should comprise, in addition to static mixing elements, possibly also a filter element, for instance a rib filter.

The term "monolithic structural member" as used in this application is intended to mean a structural element which has no weaknesses caused by joints—for instance soldered joints (although a structural member with weld joints may be monolithic). The sleeve parts referred to herein comprise in an extreme case only the flange-like parts which are, in this case, tubular.

DESCRIPTION OF THE PREFERRED EMBODIMENTS

Figure 1:
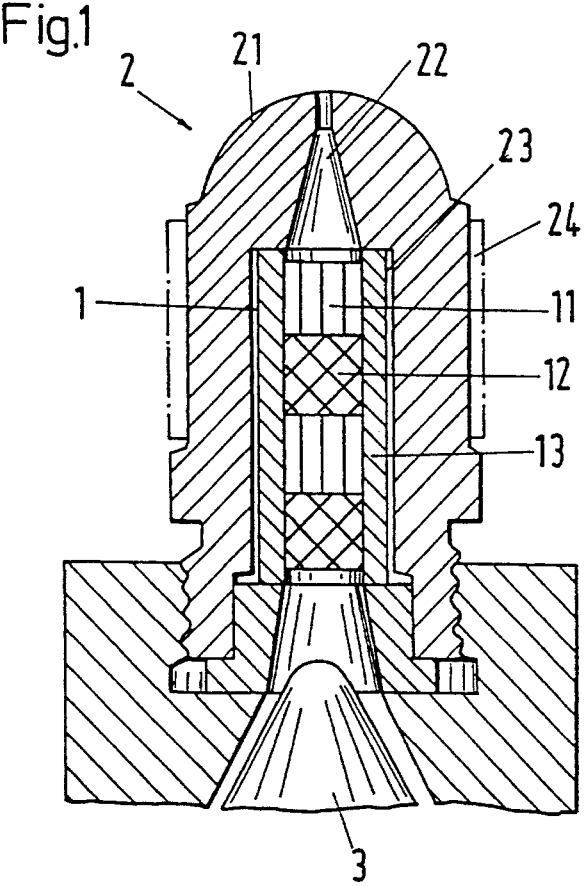
FIG. 1 is a cross-section of the nozzle of an injection molding machine having a mixing head of a known design.
Figure 2:
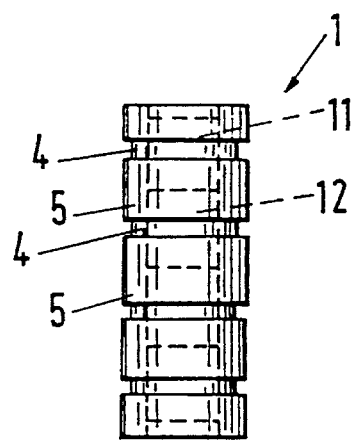
FIG. 2 shows a mixing head made according to the invention.
Figure 3:
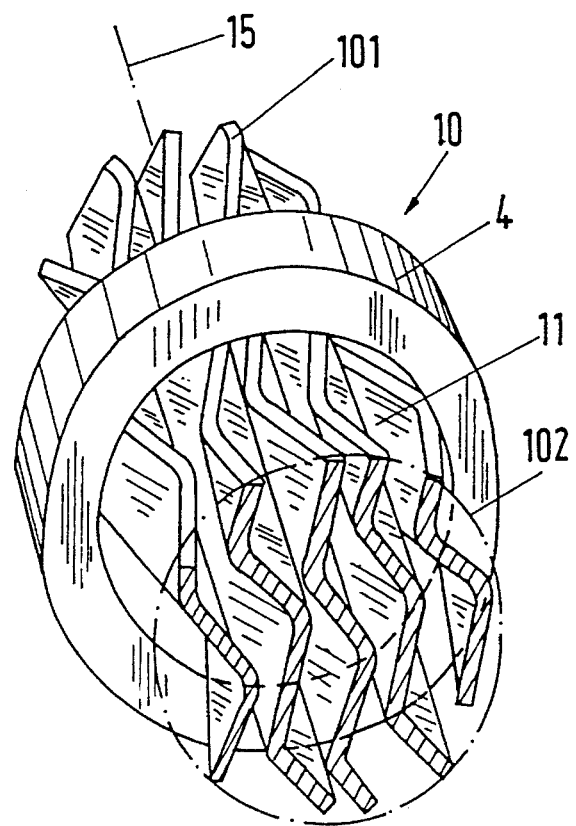
FIG. 3 shows a mixing element of a device made according to the invention.

The nozzle 2 shown in FIG. 1 has the following components: a mixing head 1 with mixing elements 11, 12 and a sleeve 13; a nozzle head 21 with a nozzle orifice 22 and a bore 23 for the mixing head 1; by chain lines is indicated a strip heater 24; and finally the tip of an extruder screw 3. FIG. 2 shows a side elevation of a mixing head 1 according to the invention which does not have a one-piece sleeve 13, as in the known design, but has a composite sleeve comprising parts 4 and 5. The part 4 forms, together with the mixing element 11, a monolithic structural member 10. FIG. 3 shows a first embodiment: The part 4 is a flange-like part of the structural member 10 by means of which this part is anchored between the sleeve parts 5. The part 4 is ring-shaped and situated perpendicularly to a sleeve axis 15; in the illustrated example the part 4 is situated in the middle of the mixing element 11. The mixing element 11 is composed of layers 101 of pleated lamellae between which are situated, due to often pleating, channels which often cross each other. The circle 102, drawn in a chain line, indicates the outer outline of the end face.

Figure 4:
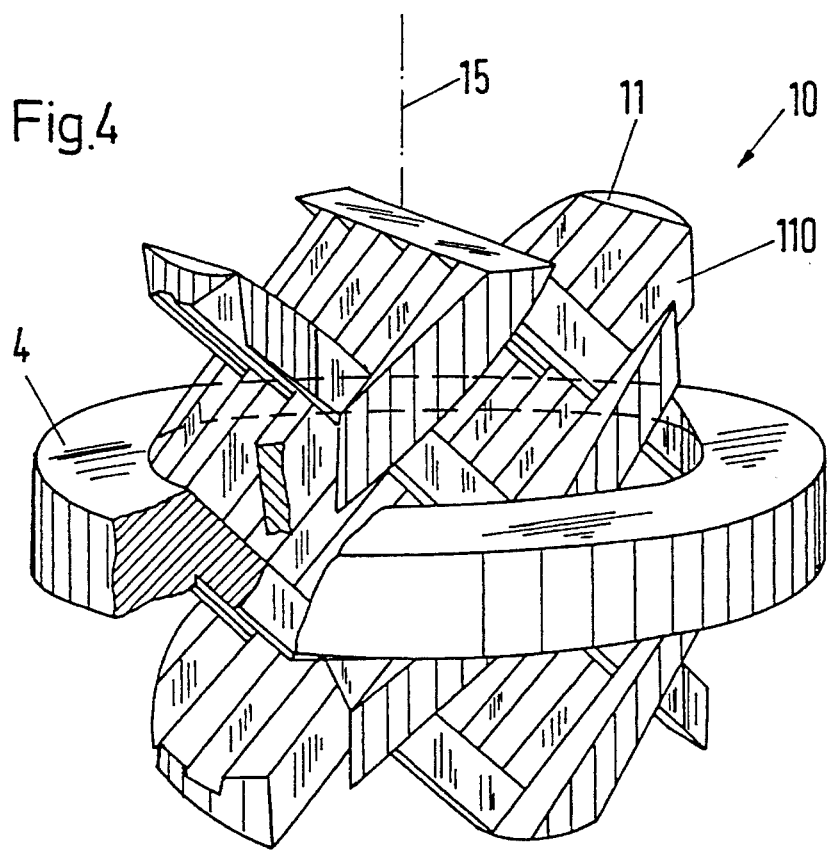
FIG. 4 shows a second embodiment of a mixing element made according to the invention.

The monolithic structural member 10 shown in FIG. 4 has also a flange-like part 4 which is ring-shaped and is situated in the middle of the mixing element 11. The flange-like part 4 is partly broken away to show that the structural member 10 is monolithic. The mixing element 11 comprises a plurality of longitudinally arranged webs 110. The webs 110 of adjacent layers cross each other; they make with the sleeve axis 15 an angle of 45° (this angle can also assume values between 10° and 70°).

Figure 5:
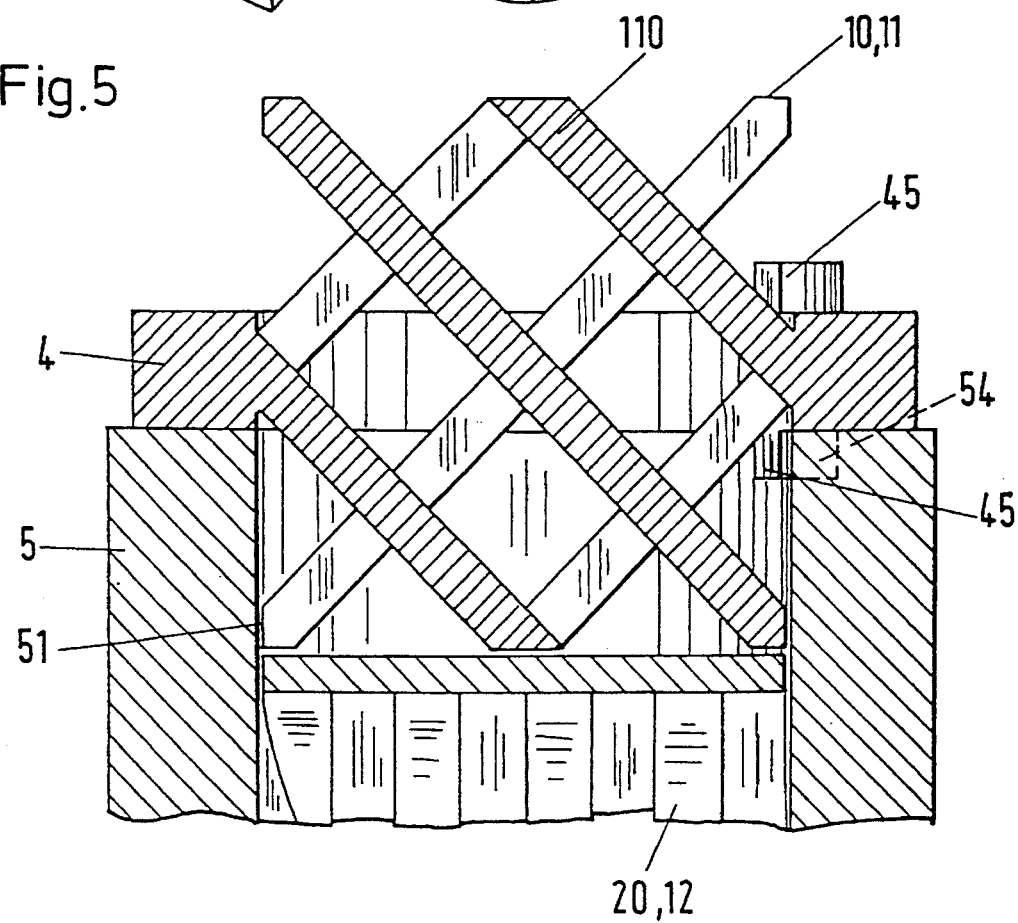
FIG. 5 is a cross-section shown in the mixing element of FIG. 4, FIGS. 6 and 7 illustrate are further variants of mixing elements.

FIG. 5 shows in cross-section the structural member 10 of FIG. 4, a portion of a tubular sleeve part 5 and a structural member 20 which is adjacent to the structural member 10 and comprises a mixing element 12. Between the sleeve part 5 and the webs 110 may be a gap 51. In contrast to what is shown, the outer diameter of the sleeve part 5 and the outer diameter of the ring 4 can have the same dimension. The ring 4 has bosses 45 and the sleeve part 5 has corresponding recesses 54 for aligning the structural member 10 with respect to the adjacent structural member 20.

The structural members 10 and the sleeve parts 5 are only fitted together (connections between the parts by mating shapes). The parts may therefore be easily separated from each other so that the device of the invention can be easily cleaned.

Figure 6:
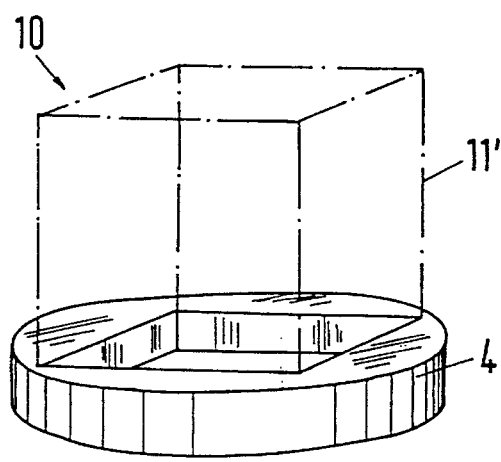

FIG. 6 shows a variant of the structural element 10 in which the mixing element 11' shown by chain lines, is cube-shaped or cuboid-shaped. In addition to the mixing element types shown in FIGS. 3 and 4 other known types may also be used (see e.g. M. H. Pahl and E. Muschelknautz, Chem.-Ing.-Tech. 52, 1980, p. 285–291, particularly FIG. 1d).

Figure 7:
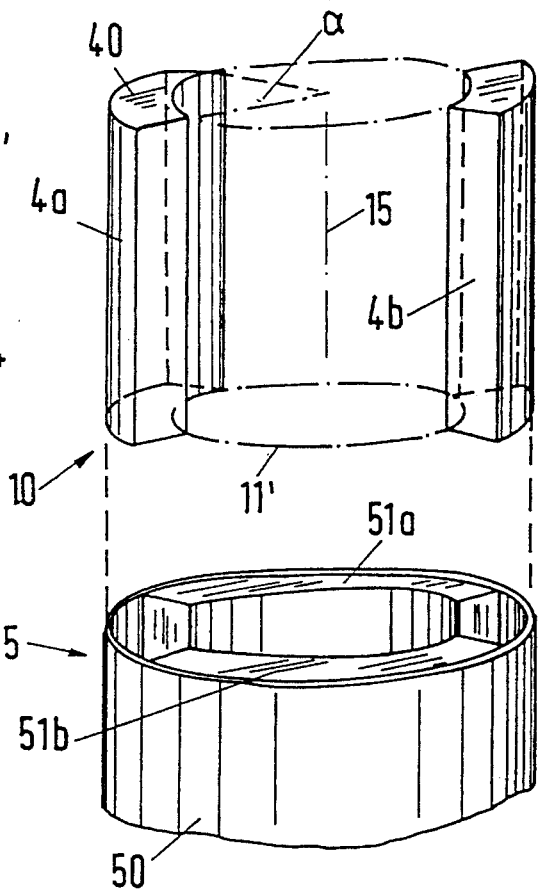

In the structural member 10 shown in FIG. 7 two ribs 4a and 4b provide the anchoring in the sleeve. The end face 40 is an annular sector which lies within the central angle α (with the sleeve axis 15 as the center). This angle is, for instance, 60°. With the structural member 10 may be associated a sleeve part 5 comprising a thin-walled tube 50 and two parts 51a and 51b, which are shaped complementary to the space between the ribs 4a and 4b.

Figure 8:
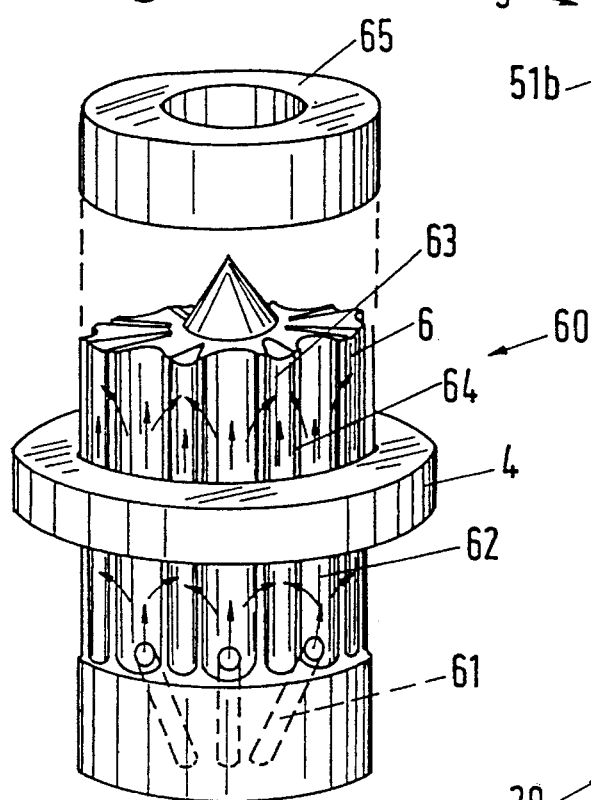
FIG. 8 shows a rib filter element for a device made according to the invention.

If the melt to be homogenized comprises impurities in the form of particles it is recommended to provide in the device, according to the invention, additionally a filter element. An example of such filter element—namely a rib filter 6—is shown in FIG. 8. Through supply channels 61 arrives the melt into axial distribution channels 62 and flows from there, over the ribs 64, into collection channels 63. The ribs 64 form together with sleeve parts (not shown) narrow passages by which the particles of impurities are retained in the distribution channels 62. The channels 62 are at their ends closed by a ring 65; the channels 63 remain partly open so that the melt may flow further, for instance into the downstream situated mixing elements. The filter element 6 and the ring 4 form, even in this case, a monolithic structural element 60.

Figure 9:
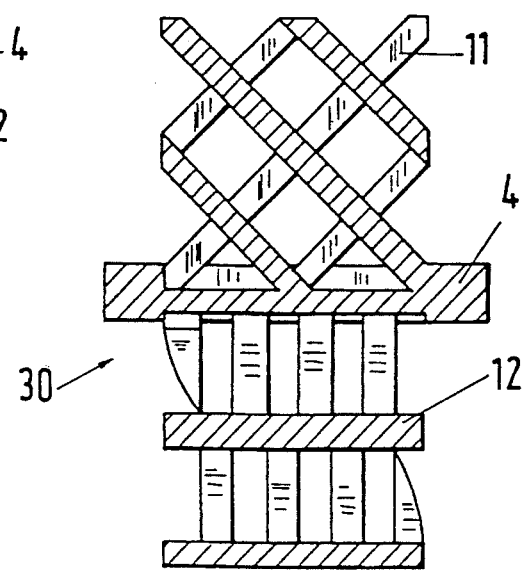
FIG. 9 shows a monolithic structural member of a device made according to the invention with two mixing elements.

FIG. 9 shows finally that always two adjacent mixing elements 11 and 12 are combined to form a monolithic structural member 30. This pair of elements has a common flange-like part 4 which ensures anchoring between sleeve parts.

For use as a mixing head or a melt mixer the monolithic structural members 10, 20, 30, 60 are preferably made of a metallic alloy by precision casting (preferably) or by sinter injection molding. For other applications it may be recommendable to make these structural members of a ceramic material or even of plastics.

What is claimed is:

1. A device for the homogenization of high-viscosity fluids comprising a sleeve having a longitudinal axis, and static mixing elements arranged in the sleeve along the longitudinal axis, the sleeve being composed of several parts, and the elements being monolithic structural members at least some of which include portions which protrude laterally with respect to the longitudinal axis and engage so as to anchor in the sleeve between the sleeve portions and thereby form additional portions of the sleeve.

2. A device according to claim 1 wherein the portions are ring-shaped and extend perpendicularly to the longitudinal axis.

3. A device according to claim 2 wherein at least one of the portions is situated in a middle region of a corresponding one of the monolithic structural members.

4. A device according to claim 1 wherein at least one of the portions forms a nose-like member of an associated one of the monolithic structural members, the nose-like member extending parallel to the longitudinal axis.

5. A device according to claim 1 wherein the mixing elements comprise webs arranged in a plurality of layers along the longitudinal axis, the webs of adjacent layers crossing each other and being inclined relative to the longitudinal axis by a unitary angle of between 10° and 70°.

6. A device according to claim 5 wherein the unitary angle is 45°.

7. A device according to claim 1 wherein one of the elements of the device is a filter.

8. A device according to claim 7 wherein the filter is a rib filter comprising a plurality of spaced-apart, longitudinal ribs disposed in the path and forming passages for flowing the fluid.

9. A device according to claim 1 wherein the monolithic structural members are of a metallic alloy.

10. A device according to claim 9 wherein the monolithic structural members are made by precision casting.

11. A device according to claim 9 wherein the monolithic structural members are made by sinter injection molding.

12. A device according to claim 1 wherein the monolithic structural members are of ceramic material.

13. A device according to claim 1 wherein the monolithic structural members are of plastics.

14. A device for the homogenization of high viscosity fluids comprising a plurality of static mixing units arranged end-to-end along a longitudinal axis of a flow path for the fluid, each mixing unit including a mixing element disposed in the path, at least one of the mixing units including a portion at least partially surrounding the associated mixing element and forming an outer boundary of a part of the path; and a plurality of conduit sections surrounding the path, being axially contiguous with the portion, and with the portion defining a tubular conduit extending and enveloping the mixing elements over a length of the path.

15. A device according to claim 14 wherein the portion is ring-shaped and fully surrounds the at least one of the mixing elements.

16. A device according to claim 14 wherein the portion only partially surrounds the at least one of the mixing elements, and including a longitudinally oriented section which surrounds a part of the at least one of the mixing elements not surrounded by the portion.

17. A device according to claim 16 wherein the longitudinally oriented section comprises a ring-shaped sector extending over an arc of less than 360°.

18. A device according to claim 17 wherein the longitudinally oriented section comprises first and second, circumferentially spaced-apart sectors.

19. A device according to claim 14 including a plurality of mixing elements having the portion.

\* \* \* \* \*